United States Patent
Angeley

(10) Patent No.: US 6,282,223 B1
(45) Date of Patent: Aug. 28, 2001

(54) ASYMMETRICAL LASER-RESONATOR HAVING SOLID-STATE GAIN-MEDIUM SYMMETRICALLY FILLED BY RESONATOR-MODE

(75) Inventor: David G. Angeley, San Jose, CA (US)

(73) Assignee: Lumenis Inc., Santa Clara, CA (US)

( * ) Notice: Subject to any disclaimer, the term of this patent is extended or adjusted under 35 U.S.C. 154(b) by 0 days.

(21) Appl. No.: 09/371,637

(22) Filed: Aug. 11, 1999

(51) Int. Cl.[7] ............................................. H01S 3/08
(52) U.S. Cl. ............................. 372/92; 372/98; 372/99
(58) Field of Search ............................. 382/98, 101, 99, 382/100, 102, 92

(56) References Cited

U.S. PATENT DOCUMENTS

| | | | |
|---|---|---|---|
| 3,680,000 | 7/1972 | Chesler et al. | 331/94.5 |
| 4,554,666 | * 11/1985 | Altman | 372/19 |
| 4,803,694 | 2/1989 | Lee et al. | 372/98 |
| 5,097,471 | * 3/1992 | Negus et al. | 372/18 |
| 5,249,190 | * 9/1993 | Kortz et al. | 372/22 |
| 5,289,479 | * 2/1994 | Oka et al. | 372/22 |
| 5,786,929 | * 7/1998 | Nabors | 359/330 |
| 5,907,574 | 5/1999 | Karni | 372/95 |

* cited by examiner

Primary Examiner—Teresa M. Arroyo
Assistant Examiner—Davienne Monbleau
(74) Attorney, Agent, or Firm—Eitan, Pearl, Latzer & Cohen-Zedek

(57) ABSTRACT

A laser includes an asymmetrical laser-resonator formed between a concave maximally-reflecting mirror and a plane output-coupling mirror. The laser-resonator includes a transversely optically-pumped gain-medium rod asymmetrically located in the laser-resonator closer to the output-coupling mirror than to the maximally-reflecting mirror. Components of the laser-resonator are configured, dependent upon the thermal-lensing coefficient of the gain-medium and optical pumping power, such that the laser-resonator operates as a stable resonator generating a multimode circulating laser-beam. The beam has a width at the maximally-reflecting mirror greater than its width at the output-coupling mirror for reducing laser-damage to the maximally-reflecting mirror. The beam symmetrically fills the gain-medium thereby providing optimum laser-energy extraction from the gain-medium.

5 Claims, 1 Drawing Sheet

ASYMMETRICAL LASER-RESONATOR HAVING SOLID-STATE GAIN-MEDIUM SYMMETRICALLY FILLED BY RESONATOR-MODE

TECHNICAL FIELD OF THE INVENTION

The present invention relates in general to solid-state lasers for medical applications. The invention relates in particular to a multimode, solid-state laser having a gain-medium rod located in a stable resonator formed between a concave high-reflection mirror and a plane output-coupling mirror.

DISCUSSION OF BACKGROUND ART

For many medical applications, such as dermatological applications, a laser is not required to have the highest possible beam quality and accordingly is not required to operate in a single fundamental mode. For these applications, efficiency, stability and compactness are important characteristics of a laser. Multimode operation of a laser typically provides higher efficiency than single-mode operation.

One laser preferred for dermatological applications is a flashlamp-pumped solid-state laser having a resonator including an Er:YAG gain medium. Such a laser is typically arranged to provide laser-radiation having a wavelength of 2.94 micrometers ($\mu$m). A preferred design of such a laser includes a symmetrical resonator formed between two plane (flat) mirrors. This can be defined as a flat-flat resonator. One of the mirrors is a maximally-reflecting mirror. The other mirror is a partially-transmitting mirror serving as an output-coupling mirror.

The gain medium is in the form of a rod of circular cross-section and is symmetrically disposed between the mirrors. The ends of the rod have a concave radius of curvature. The radius of curvature is the same at both ends of the rod. The concave radius of the rod ends serves to partially offset a positive thermal-lensing effect in the rod, the thermal-lensing effect resulting from absorption of pump-light. This resonator arrangement produces a multimode laser-beam having the same width on each end of the resonator mirrors. That portion of thermal-lensing which is not offset by the concave ends of the rod provides that the resonator operates as a stable resonator. An advantage of this type of resonator is that the laser beam optimally "fills" the gain-medium rod permitting optimum extraction of energy from the rod.

Medical lasers are usually operated over a wide range of power levels. Consequently, the thermally-induced positive dioptric power of the gain-medium varies. An advantage of the flat-flat resonator is that the resonator remains in a stable regime for a wide range of thermally-induced dioptric powers.

A characteristic of this type of resonator, however, is that as the thermally-induced dioptric-power increases, the width at the resonator mirrors of a laser-beam circulating in the resonator decreases. This increases the possibility of laser-damage to the resonator mirrors. In particular, it has been observed that the maximally-reflecting mirror is more susceptible to laser-damage than the output-coupling mirror. Accordingly, there is a need for a laser-resonator design which has the multimode operating characteristics and gain-medium energy extracting characteristics of the symmetrical flat-flat resonator but which is not limited in output-power by the laser-damage resistance characteristics of the maximally reflecting mirror.

SUMMARY OF THE INVENTION

In one aspect of the present invention, the above-discussed shortcomings of the prior-art flat-flat resonator are overcome in a laser comprising a laser-resonator formed between a concave, maximally-reflecting mirror and a plane output-coupling mirror. A rod of a solid-state gain-medium is located in the laser-resonator on a longitudinal axis thereof. The gain-medium rod is closer to the output-coupling mirror than to the maximally-reflecting mirror. A source of pump-light is provided for delivering pump-light to the rod for energizing the gain-medium. Components of the laser-resonator are configured, dependent upon a thermal-lensing coefficient of the gain-medium and the power of the pump-light delivered to the rod, such that the laser-resonator operates as a stable resonator, generating a multimode laser-beam circulating therein. Components of the resonator are also configured such that the circulating laser-beam has a width at the maximally-reflecting mirror greater than its width at the output-coupling mirror thereby reducing the possibility of laser-damage to the maximally-reflecting mirror. The resonator components are further configured such that even though the resonator is asymmetrical and the rod is asymmetrically located therein, the circulating laser-beam symmetrically fills the gain-medium rod, thereby optimizing laser-energy extraction therefrom.

The gain-medium rod has first and second ends, the first end being closest the maximally reflecting mirror. Preferably the first and second ends have respectively first and second negative radii of curvature, the first radius of curvature being less than or equal to the second radius of curvature.

In one preferred embodiment, the inventive laser includes a lens having negative dioptric-power. The lens is located in the laser-resonator proximate the first end of the rod between the first end of the rod and the maximally-reflecting mirror. The first and second radii of curvature the ends of the rod are equal.

In another preferred embodiment of the inventive laser, above-discussed beam-parameters at the mirrors and in the rod are achieved without a negative lens by incorporating an equivalent negative dioptric-power in the first end of the rod. Accordingly, in this embodiment of the inventive laser, the first radius of curvature is less than the second radius of curvature.

A laser in accordance with the present invention is particularly suited for use when single-mode operation can be sacrificed in favor of increased efficiency, and when it is desired to couple about 10% or more of circulating laser-energy out of a laser resonator. For coupling 10% or more of circulating laser-energy out of a laser resonator, the output-coupling mirror has a reflectivity of about 90% or less. The inventive laser is also particularly suited for use with a gain-medium having a strong thermal-lensing coefficient, such as Er:YAG.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
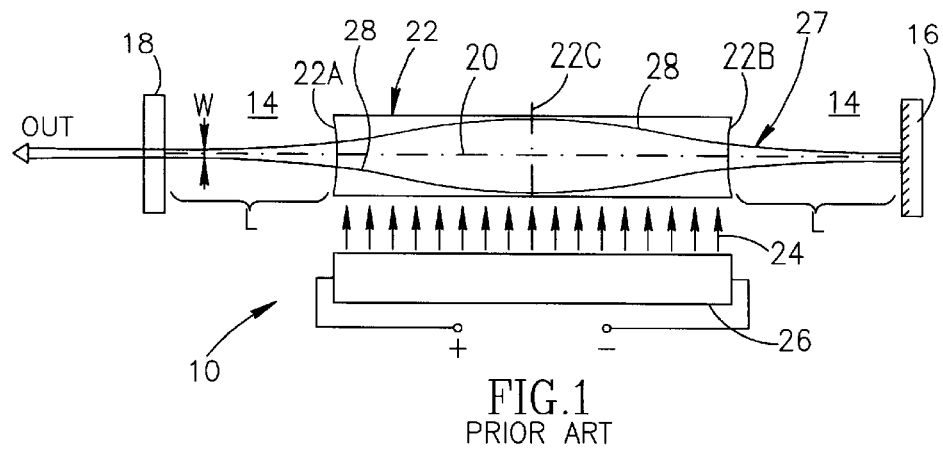
FIG. 1 schematically illustrates a prior-art flashlamp-pumped solid-state laser having a laser-resonator formed between first and second plane mirrors and including a rod of a solid-state gain-medium.

In order to assist in understanding principles of the present invention, a detailed description of the above-discussed prior-art, flat-flat resonator is first presented with reference to FIG. 1. Here, a prior-art solid-state laser 10 including a resonator 14 formed between two plane mirrors 16 and 18, and having a longitudinal resonator-axis 20 is depicted. Located in resonator 14, symmetrically located on resonator-axis 20, and symmetrically located between mirrors 16 and 18, is a rod 22 of a solid-state gain-medium. Mirror 16 is a maximally-reflecting mirror, for example, a mirror having a reflectivity greater than 99% at the output-wavelength of laser 10. Mirror 18, functioning as an output-coupling mirror, is a partially-reflecting (partially-transmitting) mirror having a reflectivity of about 90% or less and a transmission of about 10% or greater at the output-wavelength of laser 10.

Rod 22 is transversely, optically pumped by light 24 from a flashlamp 26. Those skilled in the art to which the present invention pertains will recognize that, in practice, flashlamp 26 and rod 22 would be located in a reflective or diffusive enclosure configured to provide uniform irradiation of rod 22 by pump-light 24. Some means for cooling rod 22 may also be provided. As details of such an enclosure and cooling means are well-known to those skilled in the art and are not necessary for understanding principles of the present invention, these details have been omitted for clarity, and no further description of such an enclosure is presented herein. Those skilled in the art will also recognize without further illustration that pump-light 24 may be provided by one or more diode-laser arrays.

Continuing with reference to FIG. 1, rod 22 has concave radii of curvature $R_1$ and $R_2$ formed on, respectively, ends 22A and 22B thereof. Ends 22A and 22B of the rod are located at the distance L from respectively mirrors 18 and 16. In laser 10, the radius of curvature is the same on each end, i.e., $R_1 = R_2$, and is selected such that the minimum anticipated (positive) thermal-lensing dioptric-power in rod 22 during operation of laser 10 is only partially offset by the negative dioptric-power provided by the concave ends of rod 22. This provides that under all anticipated operating conditions of the laser there will be some residual thermal-lensing power, sufficient that resonator 14 always operates as a stable resonator. The positive thermal-lensing power depends on a thermal-lensing coefficient of the gain-medium and generally increases with increasing pump-power.

Resonator 14 provides a multimode beam 27 which is contained within an envelope (mode-shape) designated in FIG. 1 by solid lines 28. The width W of the beam, at any position along resonator-axis 20, is defined as the mode-size or spot-size. An advantageous characteristic of the symmetrical, flat-flat resonator 14 of laser 10 is that the mode-size has a maximum at the center 22C of rod 20. At each end of the rod, the mode-size is the same, being smaller than the maximum size. The divergence of the beam designated by lines 28 is the same at each end of rod 22. This symmetrical mode-distribution or mode-fill in rod 22 provides for optimum extraction of laser energy from rod 22. Consistent with the symmetrical mode-distribution in rod 22, the mode-size at mirrors 16 and 18 is the same. It is this characteristic that is disadvantageous in prior-art resonator 14 for reasons as follows.

In a laser 10 in which rod 22 is an Er:YAG rod providing laser radiation at 2.94 $\mu$m, it has been consistently observed that maximally reflecting mirror 16 has a lower laser-damage threshold than output-coupling mirror 18. It is believed, without being limited to a particular hypothesis, that this is because, in a multilayer dielectric mirror of the type typically used for laser-resonator mirrors, a higher reflectivity creates a higher electric-field in a mirror. This difference becomes less distinct for mirror reflectivity higher than about 90%, possibly due to a smaller difference in electric-field and obscuration of electric-field effects due to reflectivity-independent defect-related effects. It is believed that the relatively long lasing-wavelength of Er:YAG (compared, for example, with Nd:YAG) reduces the contribution of defect-limited effects thereby allowing reflectivity-related effects to dominate.

Generally, the harder the gain-medium of the laser-resonator is optically-pumped, the greater the reflectivity of the output-coupling mirror must be correspondingly reduced in order to extract maximum power from the laser-resonator. While those skilled in the art will recognize that power obtainable from a gain-medium is eventually limited by saturation no matter how hard the gain-medium is pumped, in a prior-art laser-resonator having the arrangement of laser 10, the maximum-obtainable power at optimum output-coupling has been found to be limited by the damage-threshold of maximally-reflecting mirror 16.

Figure 2:
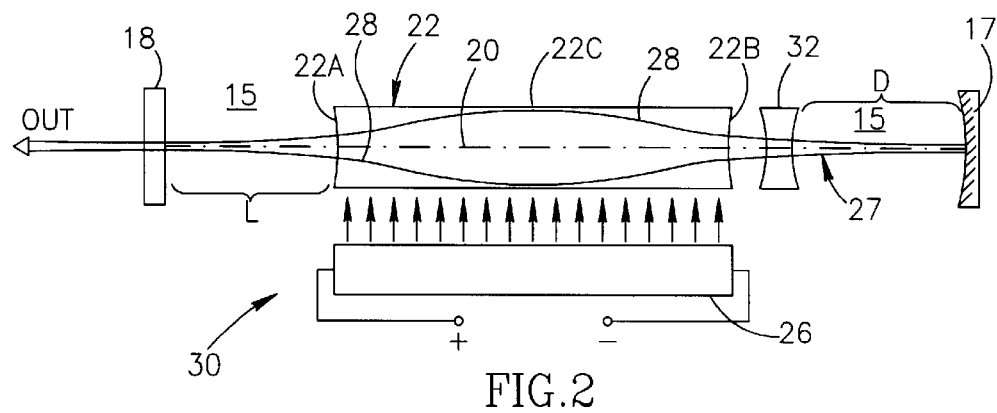
FIG. 2 schematically illustrates one preferred embodiment of a solid-state laser in accordance with the present invention having a laser-resonator formed between a plane mirror and a concave mirror and having a negative lens positioned between a rod of a solid-state gain-medium and the concave mirror.

Referring now to FIG. 2, one preferred embodiment 30 of a solid-state laser in accordance with the present invention is illustrated. Laser 30 is configured to provide the same operating characteristics, including the symmetrical mode-fill in gain rod 22, of laser 10. Laser 30 has an asymmetrical resonator 15 formed between a maximally-reflecting mirror 17 and an output-coupling mirror 18. Resonator 15 includes a rod 22 of a solid-state gain-medium, the rod being configured the same as rod 22 of laser 10, including ends 22A and 22B having the same concave radius of curvature.

Here again, the radius of curvature is selected such that the minimum anticipated (positive) thermal-lensing dioptric-power in rod 22 during operation of laser 10 is only partially offset by the negative dioptric-power provided by the concave ends of rod 22. This provides that under all anticipated operating conditions of the laser, i.e., under the contemplated range of power of pump-light 24, there will be some residual total-lensing power sufficient that resonator 14 always operates as a stable resonator. Those skilled in the art will recognize that too high a pump-light power can cause thermal-lensing to increase to a point where the resonator would not function as a stable resonator. Those skilled in the art will also recognize that the negative dioptric-power provided by concave ends or rod 22 may be provided in whole or in part by forming a diffractive surface on the rod ends.

Maximally reflecting mirror 17 has a concave radius of curvature. A lens 32 having negative dioptric-power (a negative lens) is axially located in resonator 15 between rod 22 and mirror 17, proximate end 22B of the rod. Mirror 17 is located at a distance D from lens 32. By selecting appropriate parameters for mirror 17 and lens 32 and an appropriate value for distance D, the mode-shape in rod 22 is made symmetrical, as described above for rod 22 in resonator 14 of laser 10. Specifically, the mode-size has a maximum at center 22C of rod 22 and has the same size and divergence at each end of the rod. The effect of lens 32 is to expand or magnify the mode-size on maximally-reflecting mirror 17 to a size greater than the mode-size on output-coupling mirror 18. Expanding the mode-size on mirror 17 correspondingly reduces the laser power-density and fluence incident on the mirror, thereby reducing the possibility of laser-damage to the mirror.

Assuming that the thickness of lens 32 and the distance of lens 32 from end 22B of rod 20 is small compared with distance D, simple mathematical relationships for determining spot-size magnification while maintaining symmetrical mode-fill in rod 22 are as follows.

$$\text{Spot-size magnification} = W_{HR}/W_{OC} = D/L \tag{1}$$

where $W_{HR}$ and $W_{OC}$ are respectively the spot-sizes at maximally-reflecting mirror 17 and output-coupling mirror 18.

$$\text{Focal length } (f) \text{ of lens } 32 = DL/(L-D) \tag{2}$$

$$\text{Mirror 17 concave radius} = D-f \tag{3}$$

Clearly, in order to achieve the desired spot-size magnification on mirror 17, resonator 15 is made asymmetrical by virtue of the longer distance of mirror 17 from rod 22 compared with the distance of mirror 18 from rod 22. Nevertheless, by selecting resonator parameters as discussed above, the mode-fill in rod 22 is maintained symmetrical, thereby providing that particular advantage of the prior-art flat-flat resonator of laser 10.

It should also be noted here, that while lens 32 is depicted as a bi-concave, refractive optical-element, the lens may be a plano-concave element or a concave-convex negative meniscus lens consistent with the spirit and scope of the present invention. Lens 32 may even be a multi-element lens or a diffractive optical-element.

It should also be noted, that negative-dioptric-power for providing magnification of beam 27 on mirror 17 need not be provided entirely by negative lens 32, but may be provided in part by incorporating additional negative dioptric-power in end 22B of rod 22, i.e., by reducing the radius of curvature $R_2$ of end 22B of rod 22 to a value less than that of $R_1$ of end 22A of rod 22. In fact, lens 32 may be, advantageously, omitted entirely and the entire negative dioptric-power of the lens incorporated in end 22B of rod 22 for reasons discussed below. Conversely, In addition to the negative dioptric-power required for the expansion magnification of beam 27 on mirror 17, lens 32 may be provided with additional negative dioptric-power for compensating for thermal-lensing in which case end 22B of rod 22 would have a larger radius of curvature than end 22A thereof, i.e., $R_2$ would be greater than $R_1$.

Disadvantages of laser 30 are that the addition of negative lens 32, even with the provision of antireflection coatings on both surfaces thereof, can increase optical losses in resonator 15 above those that would be experienced in the unimpeded resonator 14 of laser 10. Lens 32 itself is also vulnerable to some extent to laser-damage. Further, the additional cost of manufacturing, mounting and aligning the lens is not an insignificant part of the cost of manufacturing the resonator.

Figure 3:
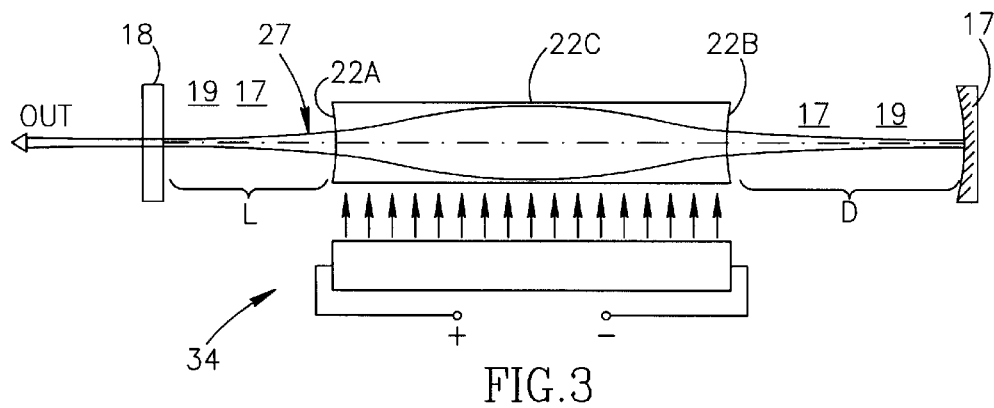
FIG. 3 schematically illustrates another preferred embodiment of a solid-state laser in accordance with the present invention similar to the laser of FIG. 2, but wherein the negative lens is omitted and the negative dioptric-power of the lens is included in a concave surface on the end of the rod facing the concave mirror.

Referring now to FIG. 3, another embodiment 34 of a solid-state laser in accordance with the present invention is illustrated. Laser 34 is configured to provide the same operating characteristics, including the symmetrical mode-fill in gain rod 22, of lasers 10 and 30. Laser 34 has an asymmetrical resonator 19 formed between a maximally-reflecting mirror 17 and an output-coupling mirror 18.

In laser 34, the negative lens 32 of laser 30 is omitted and the negative dioptric-power effect of the lens is achieved by reducing the radius of curvature of end 22B of rod 22. End 22B of the rod, accordingly, has a radius of curvature $R_2$ less than the radius of curvature of end 22A of the rod. $R_2$ is approximately related to $R_1$ and f by a relationship:

$$1/R_2 = 1/R_1 - 1/f(n-1) \tag{4}$$

where n is the refractive index of the gain-medium.

Here again, in order to achieve the desired spot-size magnification on mirror 17, resonator 15 is made asymmetrical by virtue of the longer distance of mirror 17 from rod 22 compared with the distance of mirror 18 from rod 22. In this case, even rod 22 itself is asymmetrical by virtue of the difference in radius of curvature of ends 22A and 22B thereof. Surprisingly, by selecting resonator parameters as discussed above, the mode-fill in rod 22 can be maintained symmetrical, thereby providing that advantage of the prior-art, flat-flat resonator of laser 10.

It is emphasized here that the relationships of equations (1)–(4) are approximate relationships based on simple geometrical optics. More refined values can quickly be determined from initial values determined according to the approximate relationships by using a commercially available code such as OSLO™ available from Sinclair Optics, of Fairport, N.Y.

Examples of laser-resonators in accordance with resonator 19 are given in tabular form in TABLE 1. These laser-resonators are each configured to provide the operating characteristics of a prior-art, symmetrical laser-resonator 10 in which rod 22 is an Er:YAG rod of length 92 millimeters (mm) and diameter 4 mm, and distance L is 88.75 mm for a total resonator (cavity) length of 269.5 mm. Each end of the rod has a concave radius of curvature of 300 mm. Output characteristics are an output-wavelength of 2.94 μm; stable operation over a range of thermal-lensing from 50 to 270 diopters per meter (dpm); beam quality ($M^2$) correspondingly ranging from about 5.0 to 13.4; and spot-size ($W_{OC}$) at output-coupling mirror 18 correspondingly ranging from about 0.68 mm to 3.1 mm. Spot-size is, here defined, as is usual in the art, as being the beam-width at the $1/e^2$ points of the beam. This definition should not be considered limiting, as it is the relative beam-widths which are important in the context of the present invention. The Maximum output-power is between about 30 and 40 Watts (W). Thermal-lensing, of course, varies according to the power of pump-light absorbed in rod 22. It should be noted that for a prior-art, flat-flat resonator 10, the ratio $W_{OC}/W_{HR}$ would be 1.0. Generally, for output-coupling reflectivities less than 90%, the ratio $W_{OC}/W_{HR}$ should greater than about 1.1. By way of example, it has been determined that an output-coupling mirror 18 having a reflectivity of about 85% and a resonator 19 (laser 34) having a spot-size magnification at maximally reflecting mirror 17 of about 1.16 can reliably provide maximum output-power without premature failure of maximally reflecting mirror 17.

| $W_{OC}/W_{HR}$ | Fluence Reduction | Mirror 17 Radius | Rod, $R_1$ Concave Radius | Rod, $R_2$ Concave Radius | Cavity Length |
|---|---|---|---|---|---|
| 1.10 | 17% | 1000 mm | 300 mm | 212 mm | 279.2 mm |
| 1.16 | 26% | 750 mm | 300 mm | 190 mm | 283.6 mm |
| 1.24 | 35% | 570 mm | 300 mm | 165 mm | 290.6 mm |

It should be noted here that while the present invention is described above with particular reference to a laser-resonator including an Er:YAG gain-medium, principles of the present invention are applicable to laser-resonators including other solid-state gain-media including Nd:YAG; Cr,Tm,Ho:YAG; Cr,Tm:YAG; Tm,Ho:YAG; Cr,Nd:GSSG; Er,Cr:YSGG; Nd:YLF; Er:YLF; Er,Tm,Ho:YLF; Tm,Ho:YLF; Alexandrite; and Nd:YVO$_4$. This list, however, should not be considered as limiting.

The present invention is described above in terms of a preferred and other embodiments. The invention is not limited, however, to the embodiments described and depicted. Rather, the invention is limited by the claims appended hereto.

What is claimed is:

1. A laser, comprising:

a laser-resonator;

a gain-medium located in said laser resonator, said gain-medium having a thermal-lensing coefficient and being in the form of a rod having first and second ends, said first end of said rod having a first radius of curvature and said second end of said rod having a second radius of curvature, said first radius of curvature being less than said second radius of curvature;

a source of optical pump light arranged for energizing said gain-medium thereby causing a beam of laser radiation having a laser-wavelength to circulate in said laser-resonator;

said laser-resonator formed between first and second mirrors; said first mirror being a concave mirror having a third radius of curvature greater than said second radius of curvature and said first mirror being coated for maximum reflectivity at the laser wavelength and said second mirror being a plane mirror coated for partial reflectivity and partial transmission at the laser wavelength and functioning as an output-coupling mirror;

said first and second ends of said rod being located at respectively first and second distances from said first and second mirrors said first distance being greater than said second distance; and wherein said first, second and third radii of curvature are selected dependent on said thermal-lensing coefficient and power of said pump-light such that said laser resonator operates as a stable resonator with said circulating laser beam being a multimode beam, and such that said circulating laser beam has a greater width at said first mirror than its width at said second mirror, and has equal width at each end of said rod and a maximum width in said rod at about the center thereof.

2. The laser of claim 1 wherein, said widths of said beam at said first and second mirrors have values $W_{HR}$ and $W_{OC}$ respectively and $W_{HR}/W_{OC}$ is greater than or equal to about 1.1.

3. The laser of claim 1, wherein said gain medium is a gain-medium selected from the group of gain-media consisting of Er:YAG; Nd:YAG; Cr,Tm,Ho:YAG; Cr,Tm:YAG; Tm,Ho:YAG; Cr,Nd:GSSG; Er,Cr:YSGG; Nd:YLF; Er:YLF; Er,Tm,Ho:YLF; Tm,Ho:YLF; Alexandrite; and Nd:YVO$_4$.

4. The Laser of claimed 3, wherein said gain-medium is Er:YAG.

5. The laser of claim 1, wherein said second mirror has a reflectivity less than about 90%.

\* \* \* \* \*